US007006847B2

(12) United States Patent
Sato et al.

(10) Patent No.: US 7,006,847 B2
(45) Date of Patent: Feb. 28, 2006

(54) BASE STATION FOR USE IN MULTI-NETWORK CONNECTION COMMUNICATION SYSTEM AND ITS CONNECTING METHOD

(75) Inventors: Hijin Sato, Yokohama (JP); Narumi Umeda, Yokohama (JP); Yasushi Yamao, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 423 days.

(21) Appl. No.: 09/989,018

(22) Filed: Nov. 21, 2001

(65) Prior Publication Data

US 2002/0061766 A1 May 23, 2002

(30) Foreign Application Priority Data

Nov. 22, 2000 (JP) ....................................... 2000-356711

(51) Int. Cl.
*H04M 1/00* (2006.01)

(52) U.S. Cl. .................... 455/561; 455/552.1; 455/555; 455/462; 370/392

(58) Field of Classification Search ................. 455/462, 455/463, 445, 426.1, 426.2, 465, 552.1, 554.1, 455/554.2, 555, 561; 370/328, 352, 353, 370/392

See application file for complete search history.

(56) References Cited

U.S. PATENT DOCUMENTS

| | | | | | |
|---|---|---|---|---|---|
| 4,993,014 | A | * | 2/1991 | Gordon | 370/225 |
| 5,175,758 | A | * | 12/1992 | Levanto et al. | 455/458 |
| 5,412,375 | A | | 5/1995 | Wood | 455/451 |
| 5,483,589 | A | | 1/1996 | Ishida et al. | 379/220 |
| 5,590,172 | A | * | 12/1996 | Lodwig et al. | 455/436 |
| 5,675,629 | A | * | 10/1997 | Raffel et al. | 455/552.1 |

(Continued)

FOREIGN PATENT DOCUMENTS

| | | | | |
|---|---|---|---|---|
| CN | 1133541 | | | 10/1996 |
| CN | 1204931 | | | 1/1999 |
| EP | 0 708 571 | | | 4/1996 |
| GB | 2287610 | A | | 9/1995 |
| JP | 02192329 | A | * | 7/1990 |
| JP | 09-084107 | | | 3/1997 |
| JP | 10136461 | A | * | 5/1998 |
| WO | 98/45894 | | | 10/1998 |
| WO | WO 00/14986 | | | 3/2000 |
| WO | WO 00/28752 | | | 5/2000 |

OTHER PUBLICATIONS

Cordless–cellular network integration for the 3rd generation personal communication Systems S. Ghaheri Niri, R, Tafazolli Centre for Communication Systems Research, Mobile Communications Research Group, University of Surrey pp. 402 to 408 1998 IEEE.

Service Management in Intelligent Networks Salah E. Aidarous, Don A. Proudfoot, Xi–Nam Dam 1990 IEEE.

Mobile Advantage Wireless Office–A digital wireless office system for TDMA/136 networks Rune Johanson, Mikael Nilsson and Torbjorn Ward XP–000802523 1999 pp. 20–27.

Austrian Patent Office Service and Information Sector (TRF) Search Report Application No.: 200107202–4.

Official Notice of Rejection Patent Application No.: 2000–356711 Case No.: DCMH120308 Apr. 15, 2005.

*Primary Examiner*—Rafael Perez-Gutierrez
(74) *Attorney, Agent, or Firm*—Workman Nydegger

(57) ABSTRACT

A base station for use in a multi-network connection communication system and its connecting method are provided, wherein the base station is connectable simultaneously to a carrier network and a private network. The base station comprises a section for making a decision as to whether a terminal is to be connected to a carrier network or a private network, and a section for connecting the terminal to the carrier network or the private network in accordance with the decision result.

13 Claims, 12 Drawing Sheets

U.S. PATENT DOCUMENTS

| | | | | | | |
|---|---|---|---|---|---|---|
| 5,745,850 | A | * | 4/1998 | Aldermeshian et al. | 455/417 |
| 5,818,824 | A | | 10/1998 | Lu et al. | 370/328 |
| 5,890,064 | A | * | 3/1999 | Widergen et al. | 455/445 |
| 6,035,193 | A | * | 3/2000 | Buhrmann et al. | 455/426.1 |
| 6,070,081 | A | * | 5/2000 | Takahashi et al. | 455/463 |
| 6,073,029 | A | | 6/2000 | Smith et al. | 455/555 |
| 6,097,937 | A | * | 8/2000 | Sawyer | 455/406 |
| 6,112,088 | A | * | 8/2000 | Haartsen | 455/437 |
| 6,144,727 | A | | 11/2000 | Mashinsky | 379/114.02 |
| 6,169,895 | B1 | * | 1/2001 | Buhrmann et al. | 455/423 |
| 6,208,869 | B1 | * | 3/2001 | Roberts et al. | 455/465 |
| 6,314,163 | B1 | * | 11/2001 | Acampora | 379/56.2 |
| 6,317,594 | B1 | * | 11/2001 | Gossman et al. | 455/414.1 |
| 6,330,441 | B1 | | 12/2001 | Onodera et al. | 455/426.1 |
| 6,363,246 | B1 | * | 3/2002 | Williams et al. | 455/403 |
| 6,381,231 | B1 | * | 4/2002 | Silventoinen et al. | 370/332 |
| 6,529,491 | B1 | * | 3/2003 | Chang et al. | 370/335 |
| 6,539,237 | B1 | * | 3/2003 | Sayers et al. | 455/555 |
| 6,542,497 | B1 | * | 4/2003 | Curry et al. | 455/561 |
| 6,643,512 | B1 | * | 11/2003 | Ramaswamy | 455/435.1 |
| 6,687,243 | B1 | * | 2/2004 | Sayers et al. | 370/356 |
| 6,711,381 | B1 | * | 3/2004 | Cook et al. | 455/63.1 |
| 6,801,772 | B1 | * | 10/2004 | Townend et al. | 455/436 |
| 6,831,903 | B1 | * | 12/2004 | Kang | 370/352 |
| 2001/0046214 | A1 | * | 11/2001 | Kang | 370/352 |
| 2001/0046859 | A1 | * | 11/2001 | Kil | 455/426 |
| 2001/0046860 | A1 | * | 11/2001 | Lee | 455/426 |

* cited by examiner

⟨REGISTRATION DELETION⟩

BASE STATION FOR USE IN MULTI-NETWORK CONNECTION COMMUNICATION SYSTEM AND ITS CONNECTING METHOD

This application claims priority under 35 U.S.C. 119 to patent application No. 2000-356711 filed Nov. 22, 2000 in Japan, the content of which is incorporated hereinto by reference.

BACKGROUND OF THE INVENTION

1. Field of the Invention

The present invention relates to a base station for use in a multi-network connection communication system and its connecting method, and particularly to a base station for use in a multi-network connection communication system and its connecting method, in which the base station is connectable to both a carrier network and a private network.

2. Description of the Related Art

Conventionally, a mobile communication carrier (such as NTT DoCoMo Inc.) installs a base station to establish connection to a carrier network. On the other hand, a private network is constructed individually by using a radio LAN technique or the like.

However, since a carrier network base station cannot be used as a private network base station, there is a problem in that the carrier and individual must make a duplicate investment.

SUMMARY OF THE INVENTION

Therefore, in consideration of the above mentioned problem, an object of the present invention is to provide a base station for use in a multi-network connection communication system and its connecting method, wherein the base station is connectable to both a carrier network and a private network simultaneously.

In order to accomplish such an object, in the first aspect of the present invention, there is provided a base station for use in a multi-network connection communication system comprising: means for making a decision as to whether a terminal is to be connected to a carrier network or a private network; and means for connecting the terminal to the carrier network or the private network in accordance with the decision result.

Here, the base station may further comprise means for assigning resources to the communication of the terminal in accordance with predetermined setting information.

Here, the predetermined setting information may be a maximum providing ratio for users of the carrier network and/or priority.

Here, charges for the carrier network levied on an owner of the private network may be discounted in accordance with predetermined setting information.

Here, the predetermined setting information may be a maximum providing ratio for users of the carrier network and/or priority.

Here, the base station may be owned by a carrier that provides the carrier network.

Here, the base station may be owned by an owner of the private network.

In the second aspect of the present invention, there is provided a connecting method for use in a base station for use in a multi-network connection communication system comprising the steps of: making a decision as to whether the a terminal is to be connected to a carrier network or a private network; and connecting the terminal to the carrier network or the private network in accordance with the decision result.

Here, the connecting method may further comprise the step of assigning resources to the communication of the terminal in accordance with predetermined setting information.

Here, the predetermined setting information may be a maximum providing ratio for users of the carrier network and/or priority.

Here, charges for the carrier network levied on an owner of the private network may be discounted in accordance with predetermined setting information.

Here, the predetermined setting information may be a maximum providing ratio for users of the carrier network and/or priority.

Here, the base station may be owned by a carrier that provides the carrier network.

Here, the base station may be owned by an owner of the private network.

The foregoing configuration can provide the base station for use in the multi-network connection communication system and its connecting method connectable to both the carrier network and the private network simultaneously.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments in accordance with the present invention will now be described with reference to the accompanying drawings.

Figure 1:
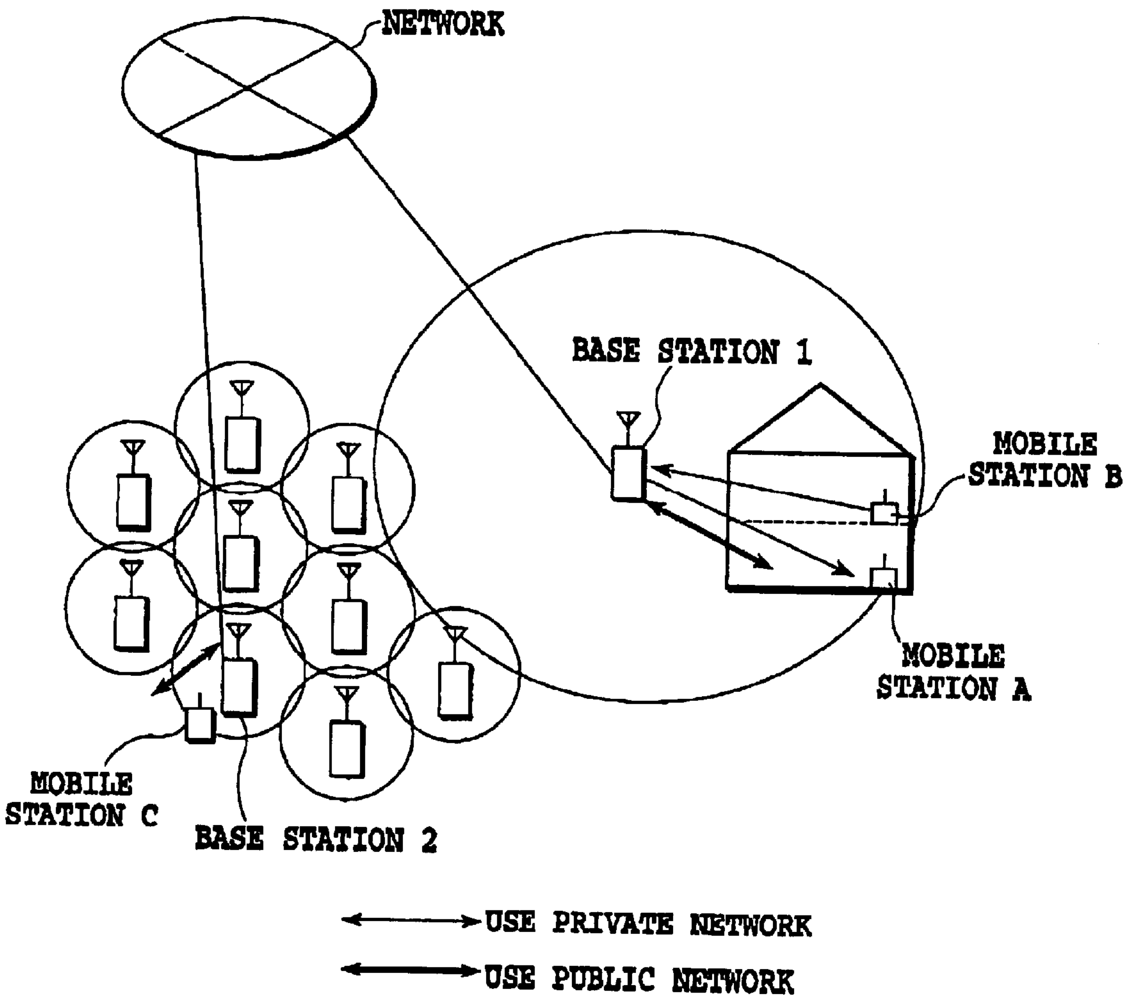
FIG. 1 is a diagram showing an implemented scheme of a multi-network connection communication system in accordance with the present invention.

FIG. 1 is a diagram showing an implemented scheme of a multi-network connection communication system in accordance with the present invention, which shows only portions relevant to the present invention.

The multi-network connection communication system in accordance with the present invention comprises at least a base station, a mobile station and a network. The network is a carrier network provided by a carrier such as a mobile switching network/mobile packet network like an IMT2000 system; GSM system and PDC/PDC-P system, a radio paging network, a local radio network such as Bluetooth, a PHS network, the Internet, an intranet, a LAN (including both wired and radio networks), a VAN, a public telephone network (including both analog and digital networks), a private network (including both analog and digital networks), a CATV network and a satellite communication network.

In the example as shown in FIG. 1, a mobile station A in a service area of a base station 1 communicates with a mobile station C in a service area of a base station 2 via a carrier network. The mobile station A is further connected with a mobile station B through a private network via the base station 1.

Figure 2:
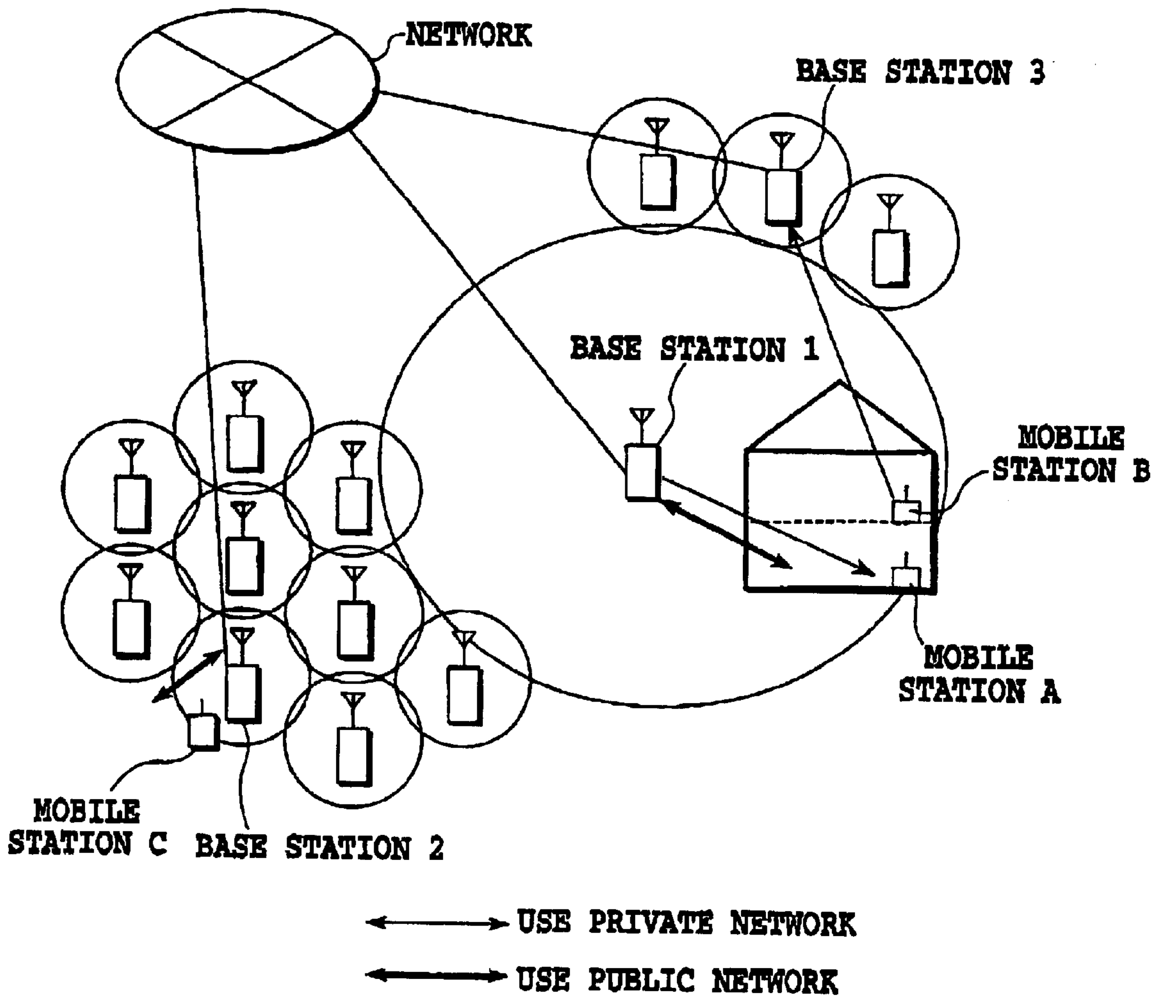
FIG. 2 is a diagram showing another implemented scheme of a multi-network connection communication system in accordance with the present invention.

FIG. 2 is a diagram showing another implemented scheme of a multi-network connection communication system in accordance with the present invention, which shows only portions relevant to the present invention.

In the example as shown in FIG. 2, a mobile station A in a service area of a base station 1 communicates with a mobile station C in a service area of a base station 2 via a carrier network. The mobile station A is further connected with a mobile station B through a private network via the base station 1 and a base station 3.

Figure 3:
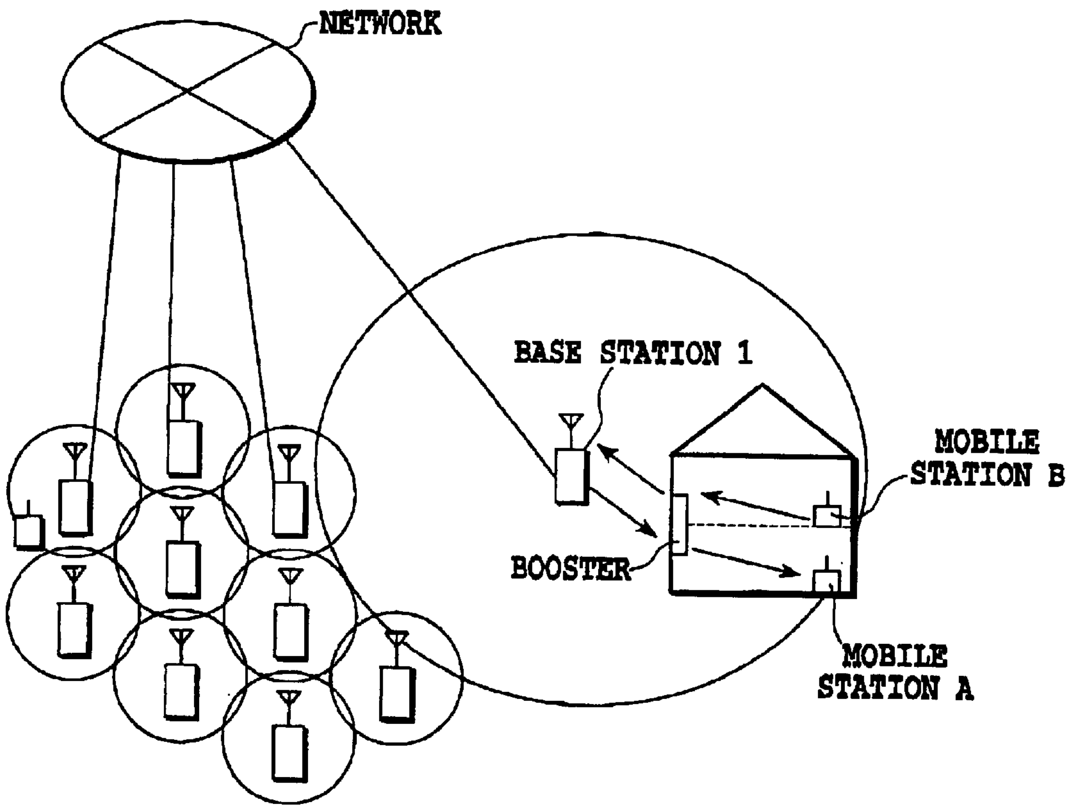
FIG. 3 is a diagram showing still another implemented scheme of a multi-network connection communication system in accordance with the present invention.

FIG. 3 is a diagram showing still another implemented scheme of a multi-network connection communication system in accordance with the present invention, which shows only portions relevant to the present invention.

In the example as shown in FIG. 3, a mobile station A and a mobile station B in a service area of a base station 1 are connected through a private network (and a carrier network) via a booster.

Thus, the multi-network connection communication systems described in connection with FIGS. 1–3 each comprise a base station simultaneously connectable to both the private network and carrier network. Utilizing the base station of the carrier as a base station of a private LAN makes it possible to obviate the LAN in the private equipment, and to efficiently use the base station with low availability.

Figure 4:
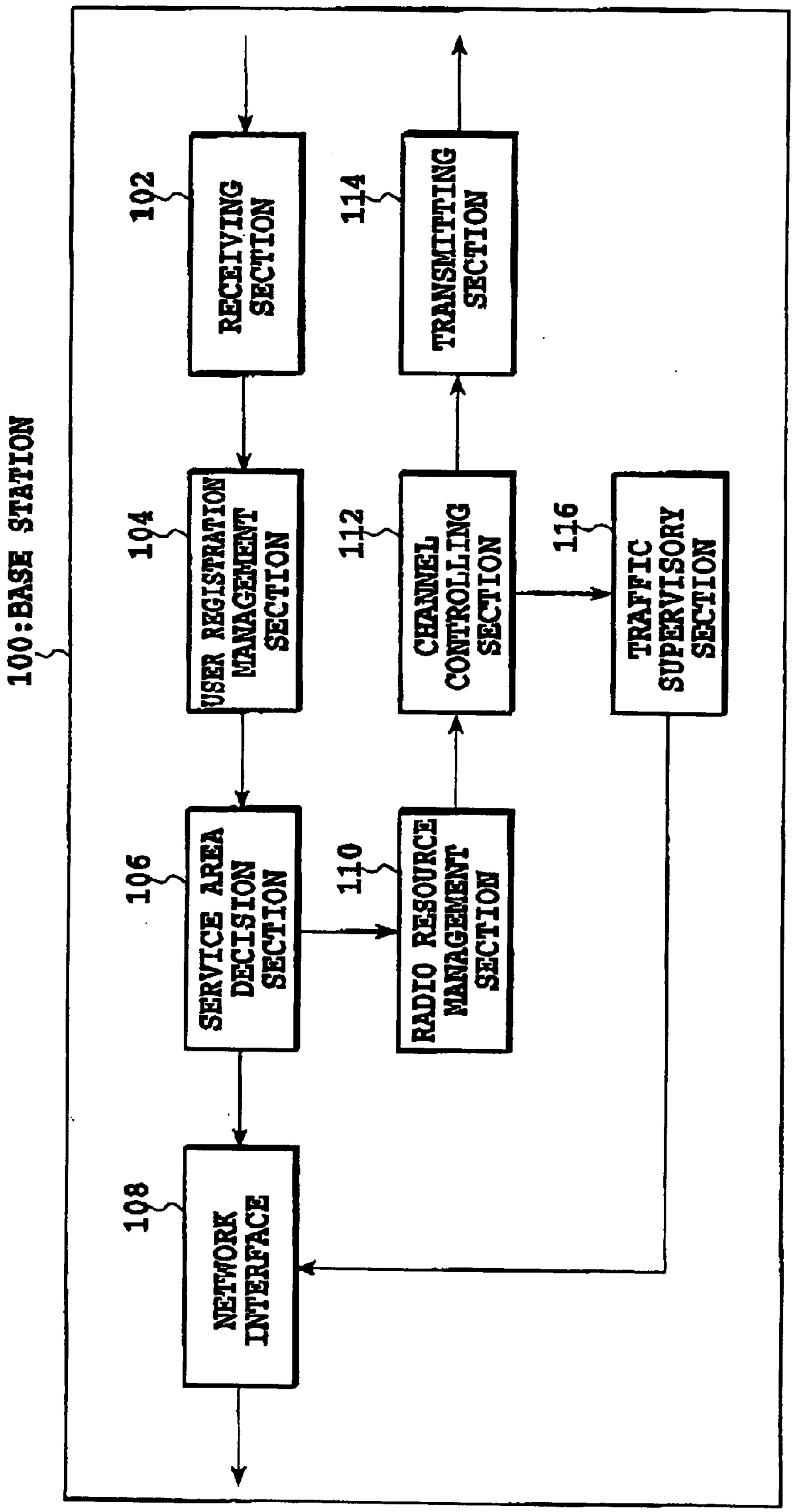
FIG. 4 is a functional block diagram showing a base station 100 in FIGS. 1–3.

FIG. 4 is a functional block diagram showing an example of the base station 100 of FIGS. 1–3, which shows only portions of the functions of the base station 100 that are relevant to the present invention.

The base station 100 comprises at least a receiving section 102 for receiving a signal from a mobile station or a carrier network; a user registration management section 104 for managing the registration of a mobile station that uses the base station as a private network; a service area decision section 106 for making a decision of a service area; a network interface 108 for establishing interface with the carrier network; a radio resource management section 110 for managing radio resources used for radio communication with a mobile station; a channel controlling section 112 for controlling channels used for the radio communication with a mobile station; a transmitting section 114 for transmitting a signal to the mobile station or the carrier network; and a traffic supervisory section 116 for monitoring the traffic for billing purposes or the like.

Next, an operation of the present embodiment of the multi-network connection communication system will be described with reference to FIGS. 5–7.

Figure 5:
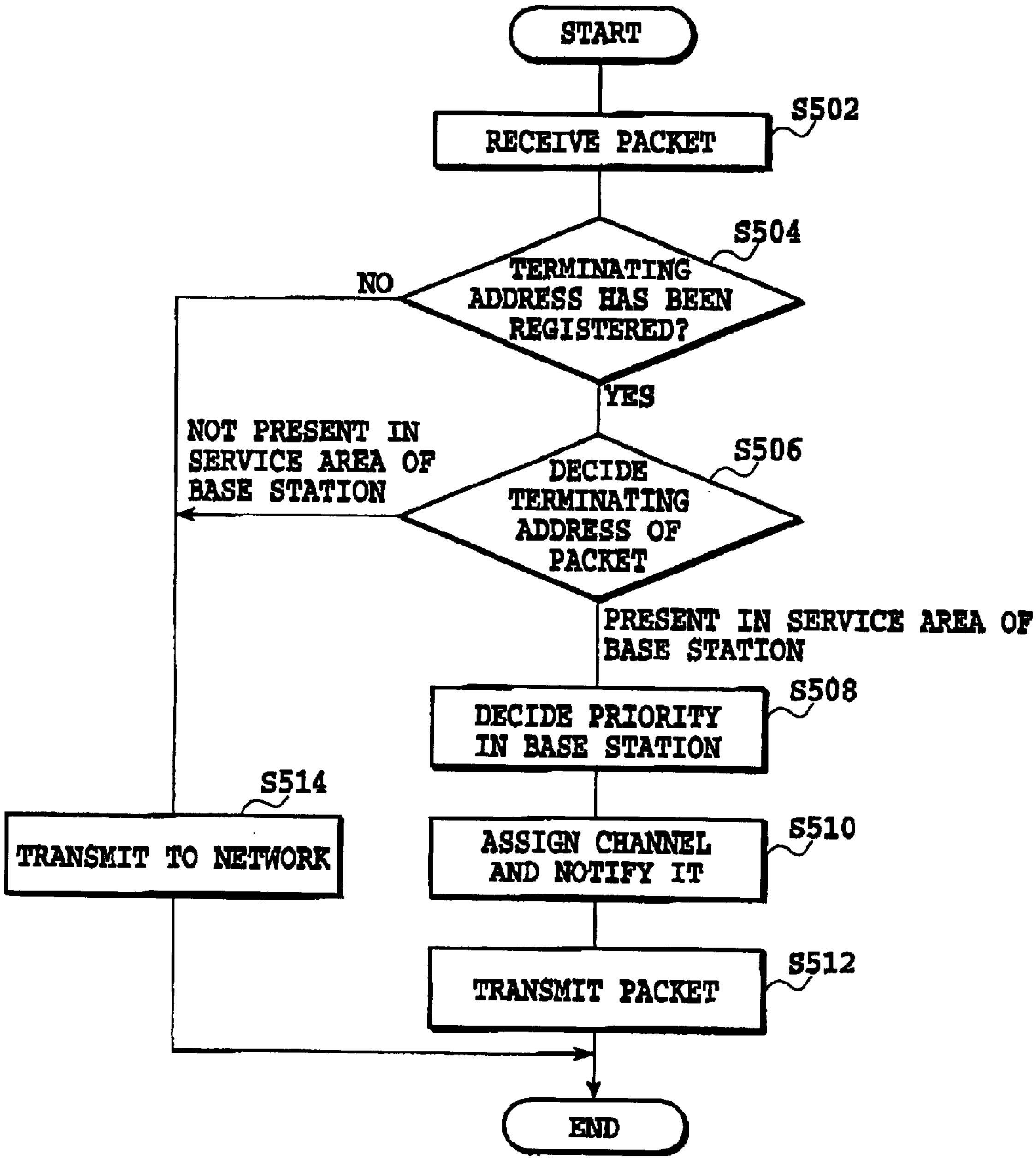
FIG. 5 is a flowchart illustrating an operation of the base station of the multi-network connection communication system in accordance with the present invention.

FIG. 5 is a flowchart illustrating an operation of the base station of the multi-network connection communication system in accordance with the present invention.

First, the receiving section 102 of the base station 100 receives a packet from the mobile station or the carrier network (step S502).

Subsequently, the user registration management section 104 of the base station 100 makes a decision as to whether the terminating address has been registered or not (step S504). When it has not yet registered, the base station 100 transmits the packet to the network (step S514), and then the packet is transmitted to another base station via a switching system and the like.

On the other hand, when the terminating address has been registered (step S504), the service area decision section 106 of the base station 100 makes a decision as to the terminating address of a received packet (step S506). When the terminating address is that of the mobile station that is not present in the area of the base station 100, the packet is transmitted to the network (step S514) so that it is sent to another base station via the switching system and the like.

On the other hand, when the terminating address is that of the mobile station currently present in the area of the base station 100, the radio resource management section 110 and channel controlling section 112 of the base station 100 assign the radio resources and a channel in accordance with the priority in the base station as will be described later (step S508), sends information about them to the mobile station (step S510), and transmits the packet to the mobile station (step S512).

Although the foregoing processing is carried out on a packet by packet basis, this is not essential. It can also be carried out using multiple packets as a unit.

Here, the decision of the priority and the assignment of the radio channel at steps S508 and S510 by the base station will be described.

First, as for the connection in the private network, that is, the connection within the base station, the lowest priority can be assigned as compared with other public services. Accordingly, during the congestion of the public services, the throughput of the traffic of the present services will be reduced. During the congestion of the traffic of the present services, the radio resources are equally assigned to terminals. When the services stretch over multiple base stations, they may be assigned an identifier indicating that it is a LAN packet, and handed over to the carrier network to which the base stations are connected. In this case, the switching system of the carrier network must have a routing function and the like.

To broadcast the distinction between the types of the base stations (such as the pros and cons of the private network services, and the pros and cons of the registration), the base station can transmit the information about that using a perch channel all the terminals can receive. Here, the perch channel is a carrier sense physical channel for a mobile station to carry out cell selection, and is subjected to special spread processing for enabling the mobile station to capture synchronization easily even in an inter-station asynchronous system. A base station that provides LAN services can transmit a signal for providing information about whether the current state is a registerable state or not in the same manner as the foregoing signal. Thus, the terminals can search for the base station, and make processing such as registration when it wishes to receive a service.

An example of a billing system will now be described in the multi-network connection communication system in accordance with the present invention. For example, as additional services, there are such billing systems for the private network connections as a free of charge system, a monthly flat-rate system, a monthly charge system after the initial use, and a monthly charge system in accordance with the traffic volume. The billing can be made by transmitting the traffic information from the traffic supervisory section 116 of the base station 100 to the carrier network so that an existing billing center can issue a billing to the user.

Figure 6:
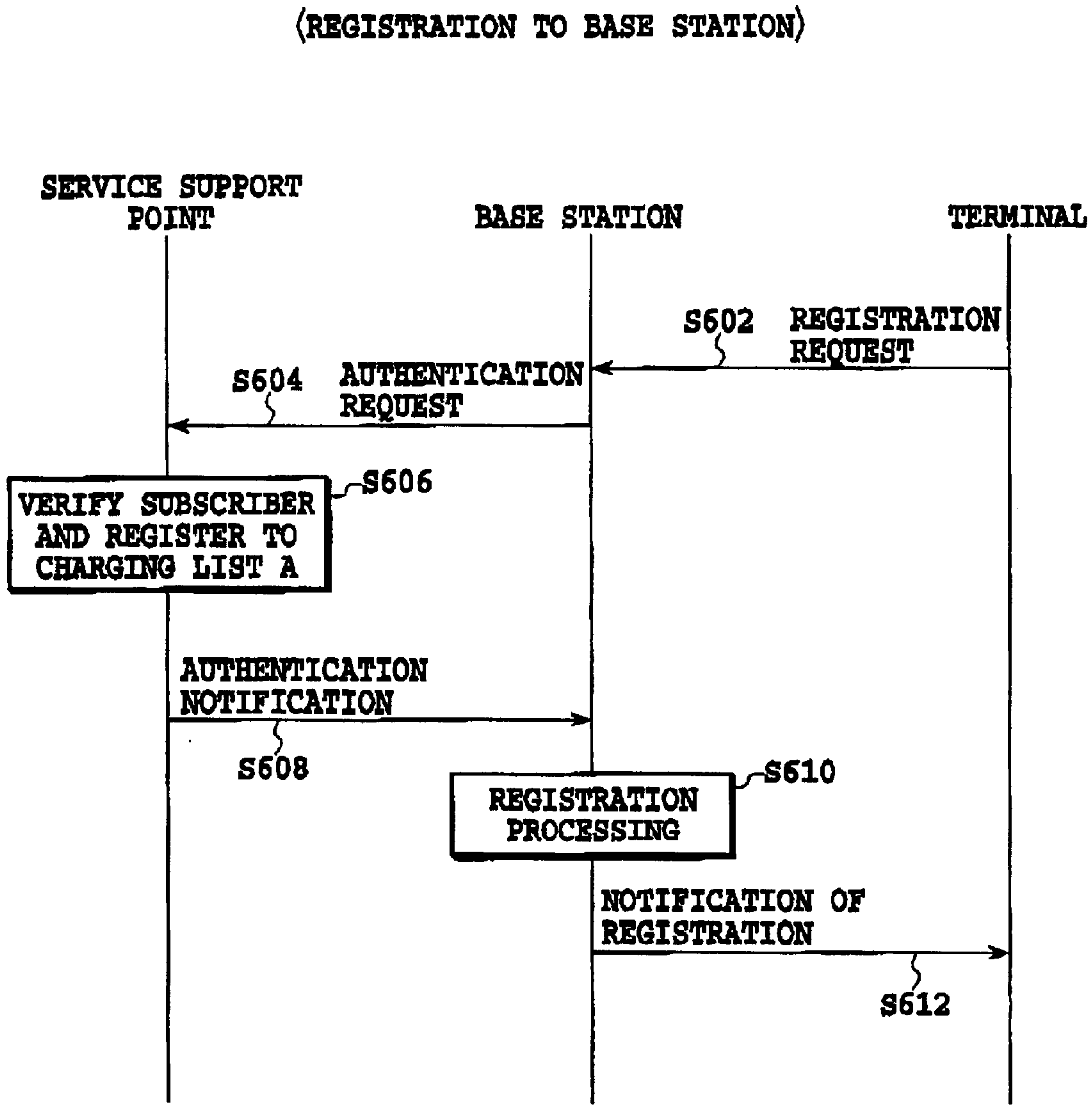
FIG. 6 is a flow diagram illustrating an operation for registering a mobile station or the like to be connected to the private network in the multi-network connection communication system in accordance with the present invention.

FIG. 6 is a flow diagram illustrating an operation of registering a mobile station or the like to be connected to the private network in the multi-network connection communication system in accordance with the present invention.

First, a terminal sends a registration request to the base station (step S602).

Subsequently, the base station sends an authentication request for the terminal to a service support point in a carrier network such as M-SCP (step S604).

Subsequently, verifying the subscriber with reference to subscriber information, the service support point registers the subscriber in a charging list (step S606).

Subsequently, the service support point transmits the authentication to the base station (step S608).

Subsequently, the base station makes the registration (step S610), and transmits a registered notification to the terminal (step S612).

Figure 7:
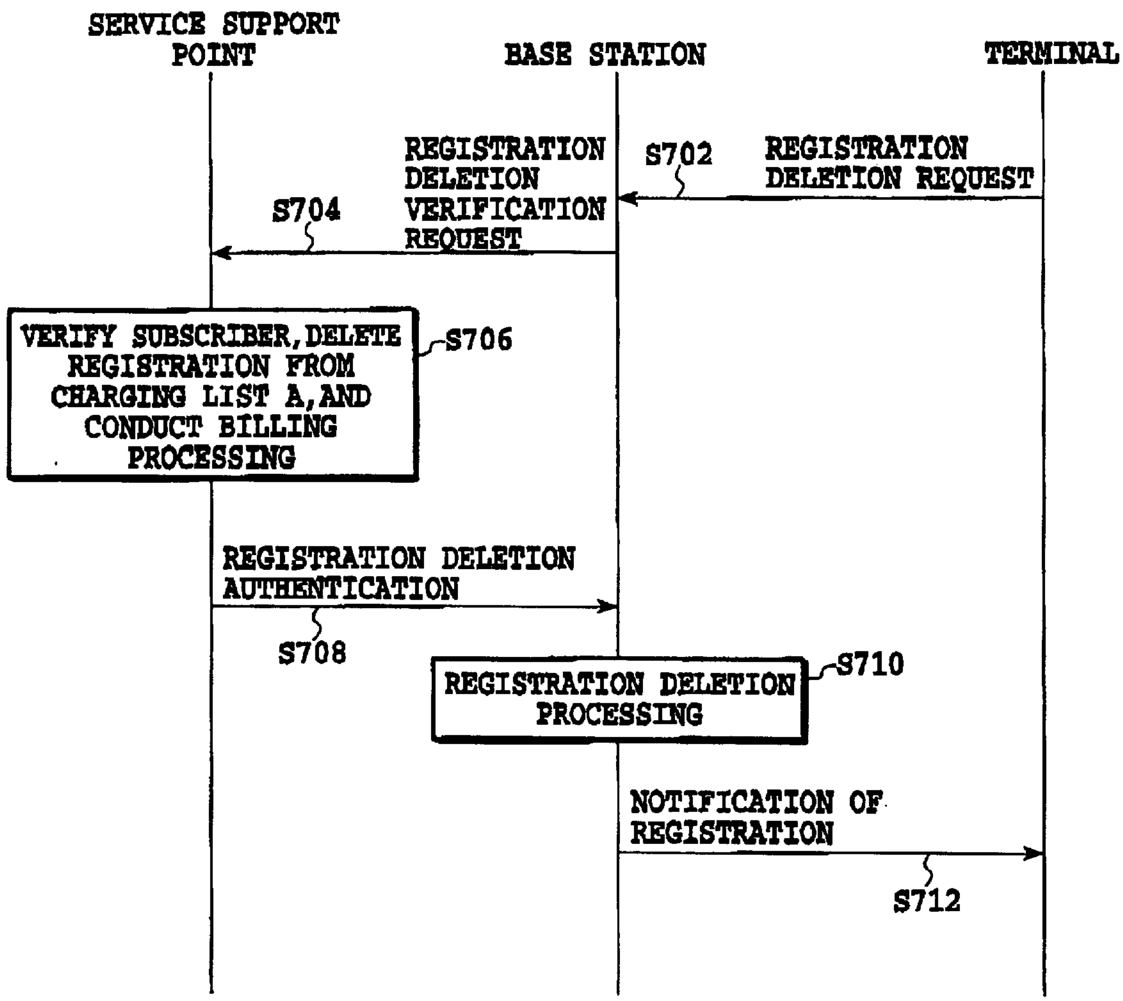
FIG. 7 is a flow diagram illustrating an operation for deleting the registration of a mobile station or the like to be connected to the private network in the multi-network connection communication system in accordance with the present invention.

FIG. 7 is a flow diagram illustrating an operation of deleting the registration of a mobile station or the like to be connected to the private network in the multi-network connection communication system in accordance with the present invention.

First, the terminal sends a registration deletion request to the base station (step S702).

Subsequently, the base station sends a registration deletion confirmation request to the service support point in the carrier network such as M-SCP (step S704).

Subsequently, referring to the subscriber information and the like, the service support point verifies the subscriber, and deletes it from the charging list (step S706).

Subsequently, the service support point transmits a registration deletion authorization to the base station (step S708).

Subsequently, the base station makes the registration deletion (step S710), and transmits a registered notification to the terminal (step S712).

(Embodiment Where Private Entity Owns Base Station)

An embodiment will now be described which includes a base station belonging not to the carrier but to a private entity in the foregoing embodiment.

A "private entity" owns a base station simultaneously connectable to both the private network and carrier network. Thus offering public services of the carrier using the private base station, the private entity enables the public to effectively use the resources of the private network. As compensation, it can receive discounts of the communication charges for the carrier network. When the private entity possesses the base station in its facilities such as a domed stadium, a station and a restaurant, the public services become available even in locations where it is difficult for the carrier to install the base station, thereby increasing the service area. In addition, this makes it possible to provide a more advanced seamless communication environment.

Figure 8:
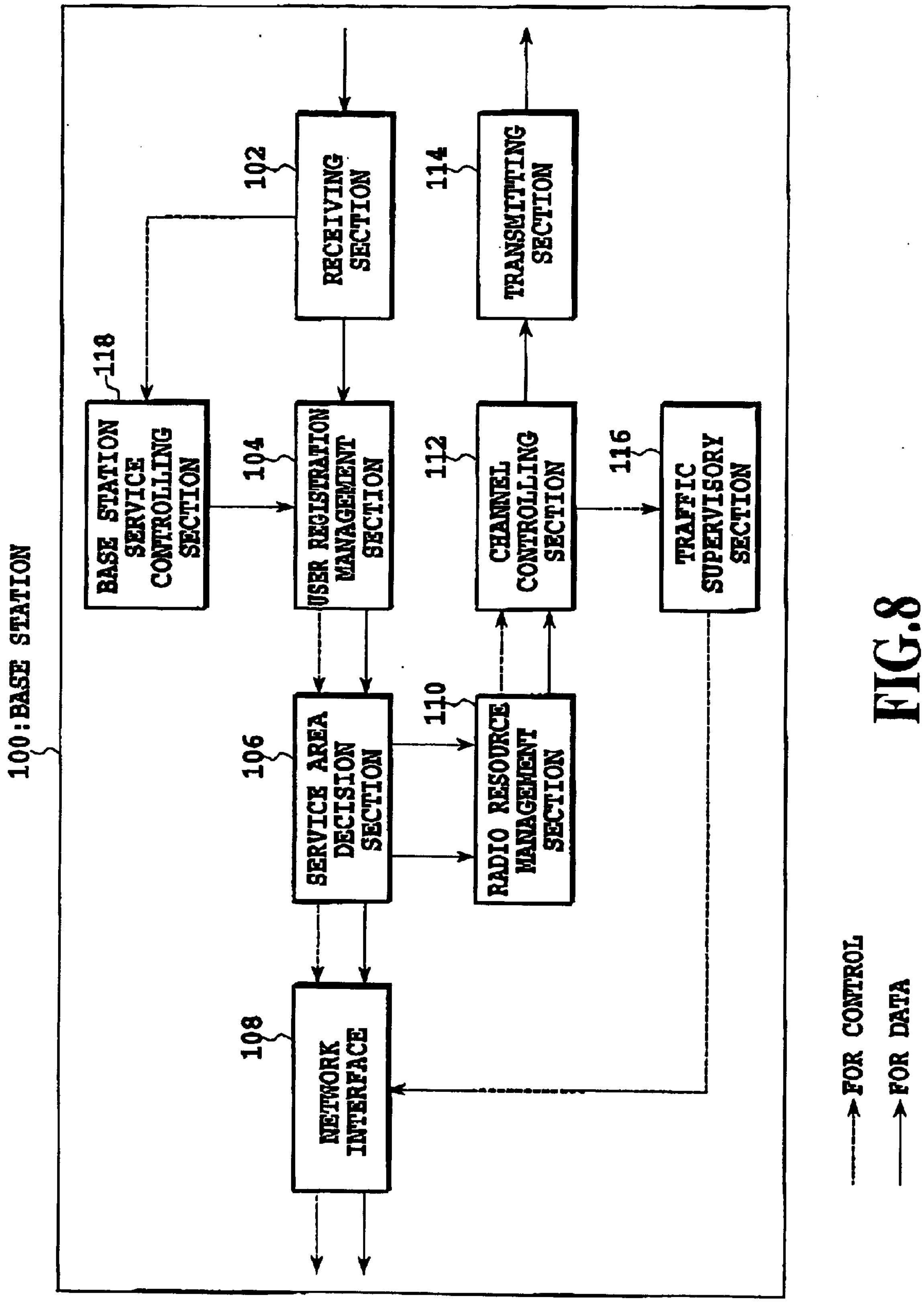
FIG. 8 is a functional block diagram showing a private base station 100, which schematically shows its functions relevant to the present invention.

FIG. 8 is a functional block diagram showing an example of a private base station 100, which shows only portions of the functions of the base station 100 that are relevant to the present invention.

The base station 100 comprises at least a receiving section 102 for receiving a signal from a mobile station or a carrier network; a base station service controlling section 118 for controlling the entire services of the base station and carries out the processing such as authentication; a user registration management section 104 for managing the registration of a mobile station that uses the base station as a private network; a service area decision section 106 for making a decision of a service area; a network interface 108 for establishing interface with the carrier network; a radio resource management section 110 for managing radio resources used for radio communication with a mobile station; a channel controlling section 112 for controlling channels used for the radio communication with the mobile station; a transmitting section 114 for transmitting a signal to the mobile station or the carrier network; and a traffic supervisory section 116 for monitoring the traffic for billing purposes or the like.

Next, an operation of the present embodiment of the multi-network connection communication system will be described with reference to FIGS. 9–12.

Figure 9:
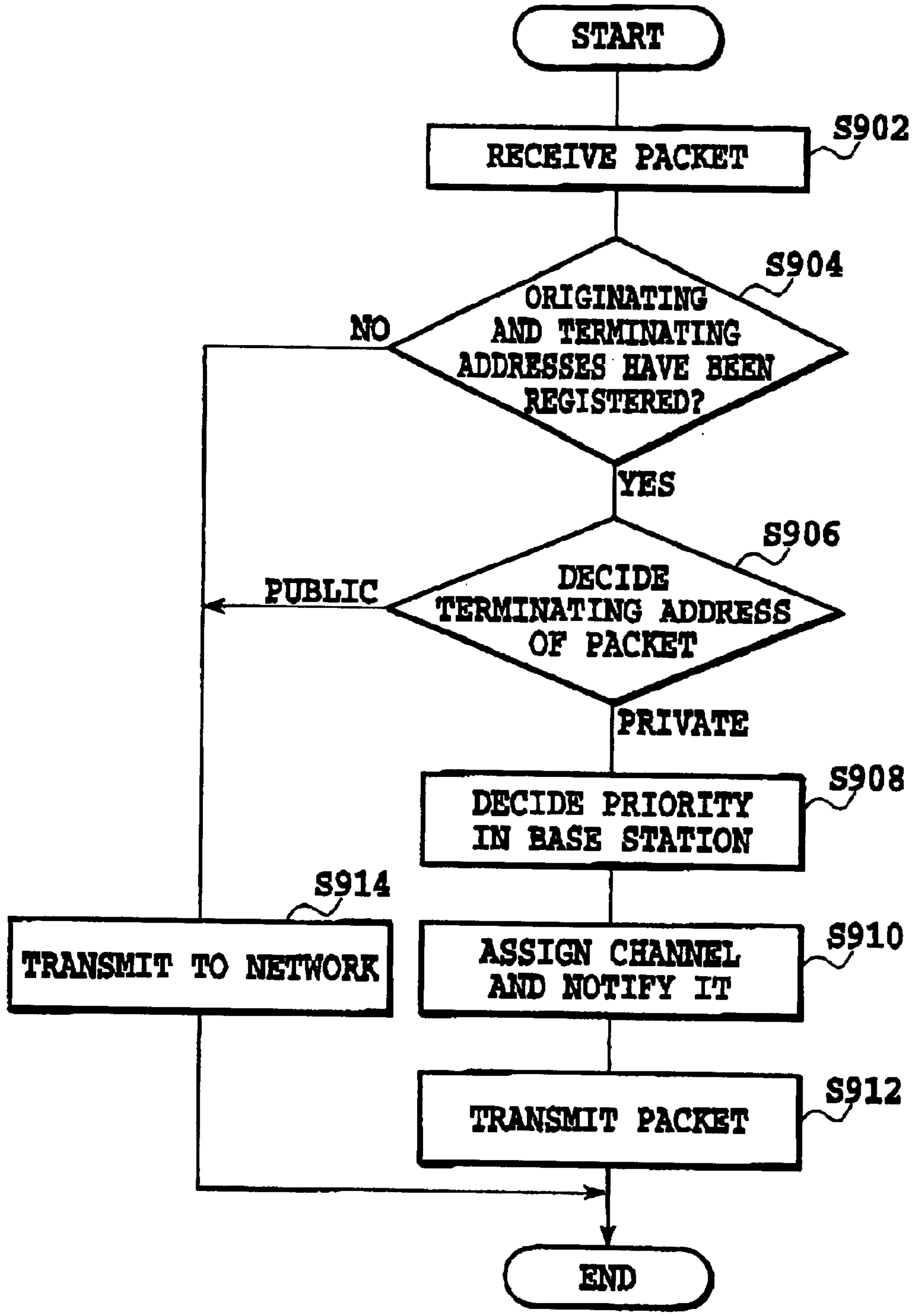
FIG. 9 is a flow diagram illustrating an operation of the base station of the multi-network connection communication system in accordance with the present invention.

FIG. 9 is a flowchart illustrating an operation of the base station of the multi-network connection communication system in accordance with the present invention.

First, the receiving section 102 of the base station 100 receives a packet from the mobile station or the carrier network (step S902).

Subsequently, the user registration management section 104 of the base station 100 makes a decision as to whether the originating address and terminating address have been registered or not (step S904). When they have not yet been registered, the base station 100 transmits the packet to the network (step S914), and the packet is transmitted to another base station via a switching system and the like.

On the other hand, when the originating address and terminating address have been registered (step S904), the service area decision section 106 of the base station 100 makes a decision as to the terminating address of a received packet (step S906). When the terminating address is that of the mobile station that is not present in the area of the base station 100, the packet is transmitted to the network (step S914) so that it is sent to another base station via the switching system and the like.

On the other hand, when the terminating address is that of the mobile station currently present in the area of the base station 100, the radio resource management section 110 and channel controlling section 112 of the base station 100 assign the radio resources and a channel in accordance with the priority in the base station as will be described later (step S908), sends information about them to the mobile station (step S910), and transmits the packet to the mobile station (step S912).

Although the foregoing processing is carried out on a packet by packet basis, this is not essential. It can also be carried out using multiple packets as a unit.

Next, the outline of the operation of the multi-network connection communication system in accordance with the present invention will be described.

First, as described later, it sets a maximum providing ratio for users of the carrier network (a maximum ratio at which the resources are assigned to the carrier network), priority, an owner and a user. Here, the term "owner" refers to the owner of the private network who can set supervisor mode about the private network. The term "user" refers to a person who carries out the private network connection. It is possible to set a plurality of users as "user", and it is possible to use the network as the private network between the users.

Subsequently, at the network connection, the setting values of the maximum providing ratio and the priority are reported first. At the update, the same operation is made. Then, the base station is loaded with a browser so that the browser can verify the setting values reported.

Subsequently, the user sets setting values on the personal computer via the terminal.

Subsequently, the base station conducts channel control in accordance with the set values. For example, it sets the priority at 40% for the public services, and 60% for the private use Considering the priority, it can be assigned to the private first and then to the public, or vise versa, for example. Alternatively, it is not necessary to assign the priority. The base station can make the radio channel assignment in accordance with the maximum providing ratio, or with the setting values of the priority.

An example of the billing system of the multi-network connection communication system in accordance with the present Invention will now be described. For example, as for the owner of the base station, the basic charge or communication charges can be reduced in accordance with the maximum providing ratio and/or the priority.

Figure 10:
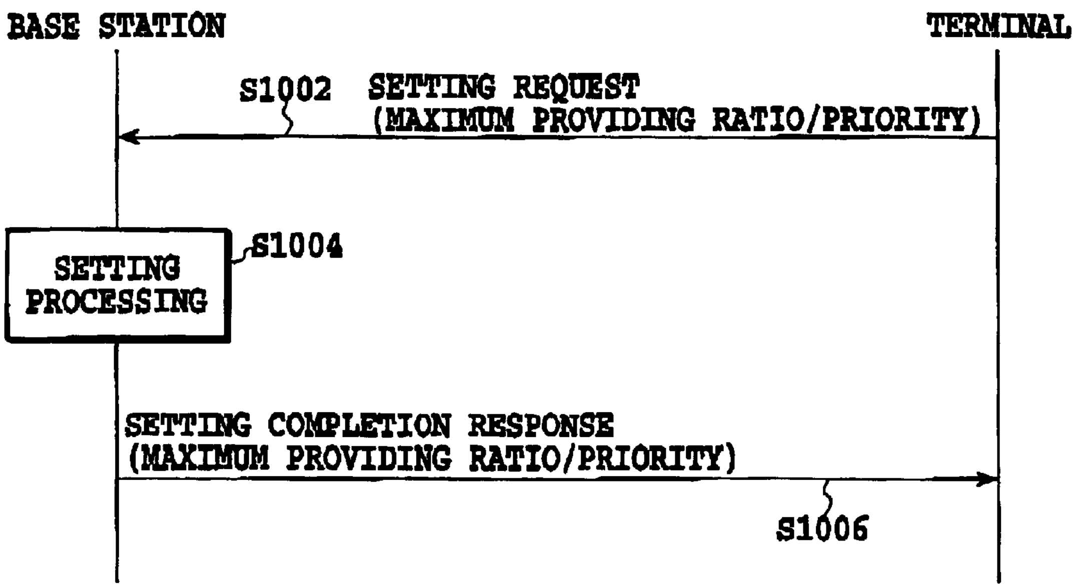
FIG. 10 is a flow diagram illustrating an operation when the owner of the base station registers a maximum providing ratio and priority in the multi-network connection communication system in accordance with the present invention.

FIG. 10 is a flow diagram illustrating an operation when the owner of the base station registers the maximum providing ratio and priority in the multi-network connection communication system in accordance with the present invention.

First, the terminal sends to the base station a setting request of the maximum providing ratio and priority (step 1002).

Subsequently, the base station carries out the setting processing of the maximum providing ratio and priority (step S1004), and transmits a setting completion response to the terminal (step S1006).

Figure 11:
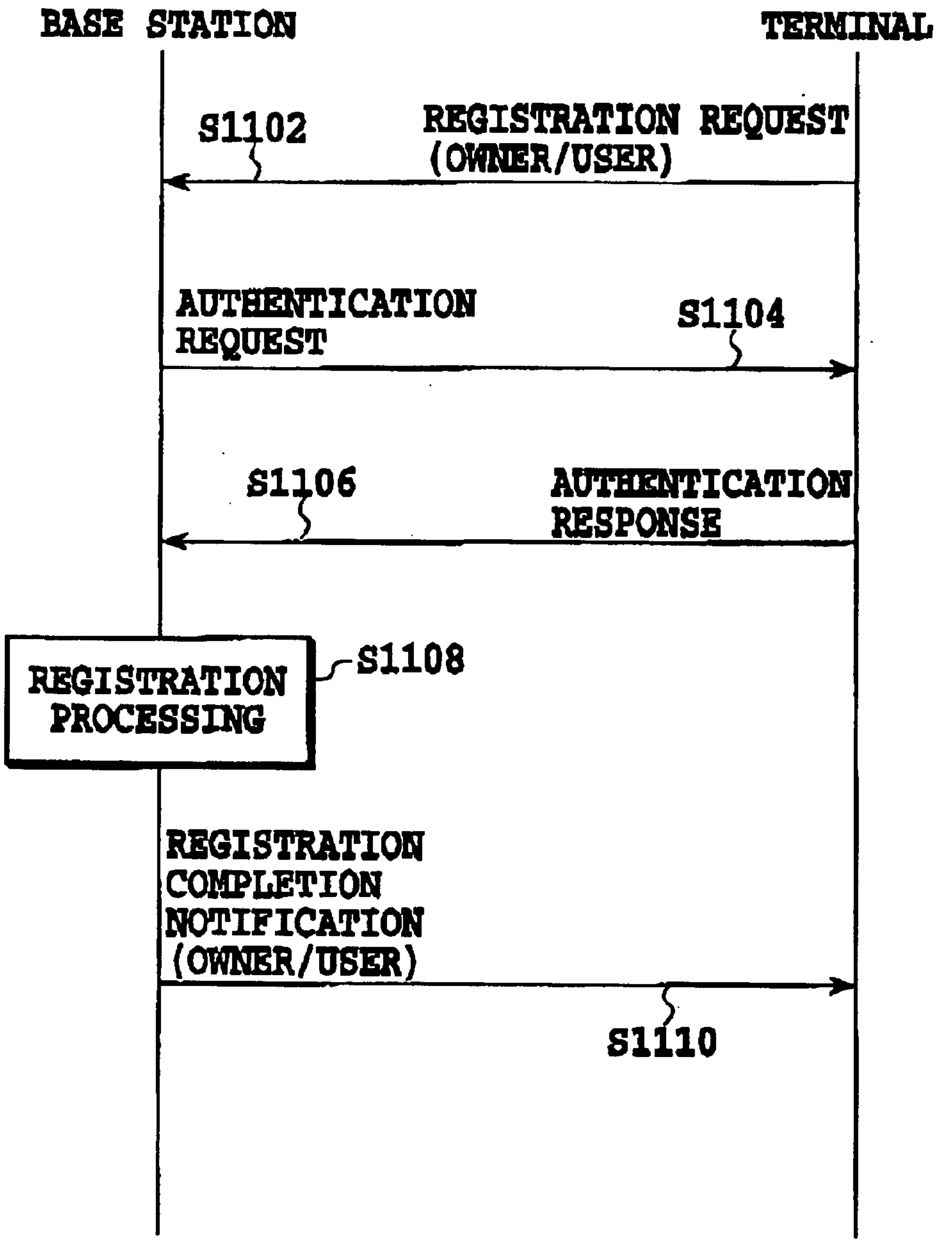
FIG. 11 is a flow diagram illustrating an operation for registering an owner and a user in the multi-network connection communication system in accordance with the present invention.

FIG. 11 is a flow diagram illustrating an operation of registering the owner and user in the multi-network connection communication system in accordance with the present invention.

First, the terminal sends a registration request of the owner and the user to the base station (step S1102).

subsequently, the base station sends an authentication request to the terminal (step S1104).

Subsequently, the terminal sends an authentication response to the base station (step S1106).

Subsequently, the base station registers the owner and user (step S1108), and transmits a registered notification to the terminal (step S1100).

Figure 12:
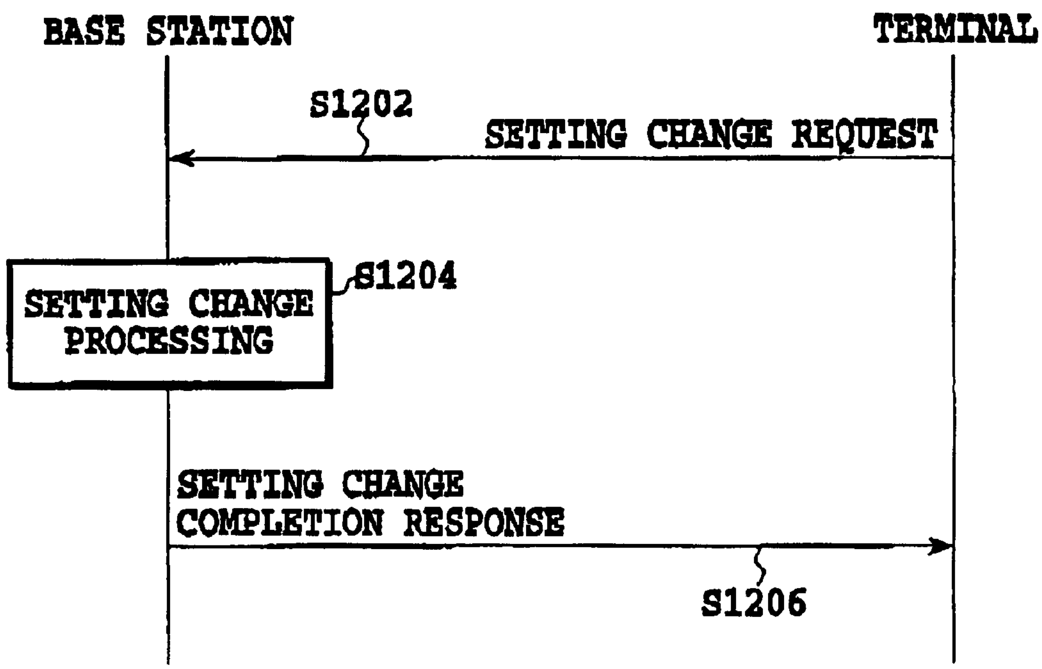
FIG. 12 is a flow diagram illustrating an operation for changing setting of a password and the like in the multi-network connection communication system in accordance with the present invention.

FIG. 12 is a flow diagram illustrating an operation of changing setting of a password and the like in the multi-network connection communication system in accordance with the present invention.

First, the terminal requests the base station to change the setting (step S1202).

Subsequently, the base station conducts the setting change processing (step S1204), and transmits the setting change completion response to the terminal (step S1206).

(Other Embodiments)

Although the foregoing embodiments are described on the assumption that they are implemented independently, this is not essential in the present invention. It is obvious to those skill in the art that they can be combined in various ways to implement other embodiments.

In addition, although the foregoing embodiments are described by way of example that employs the IMT2000 system or PDC/PDC-P system of NTT DoCoMo Inc. as the mobile telephone network/mobile packet network, this is not essential in the present invention. For example, they can be applied to other mobile telephone networks/mobile packet networks with different radio system to implement other embodiments.

Furthermore, although the foregoing embodiments are described by way of example of services and systems of the NTT DoCoMo Inc., this is not essential in the present invention. For example, they can be applied to other services and systems of other companies with similar functions to implement other embodiments.

Moreover, various changes and modifications can be implemented other than the foregoing embodiments. As long as the variations are based on the technical concept described in the claims of the present invention, they belong to the scope of the present invention.

As described above, the present invention can provide the base station for use in the multi-network connection communication system and its connecting method capable of obviating the need of the LAN equipment in the private system and to increase the efficiency of the base station with low availability, by installing the base station that is connectable simultaneously to both the private network and carrier network, and by using the carrier base station as the base station for the private LAN.

In addition, according to the present invention, offering public services of the carrier using the private base station, the private entity enables the public to effectively use the resources of the private network. As compensation, it can receive discounts of the communication charges for the carrier network. When the private entity possesses the base station in its facilities such as a domed stadium, station and restaurant, the public services become available even in locations where it is difficult for the carrier to install the base stations, thereby increasing the service area.

Furthermore, the present invention can provide a more advanced seamless communication environment.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A multi-network connection communication system comprising:

connection decision means for making a decision as to whether a mobile station is to be connected to a carrier network or a private network; and means for connecting said mobile station to said carrier network or said private network in accordance with the decision result, wherein said system further comprises:

means for broadcasting characteristics of a private network service offered by said base station;

means for registering and managing addresses of mobile stations that use the base station as the private network; and means for receiving a packet from a mobile station or the carrier network, the packet having a terminating address, wherein said connection decision means decides whether the terminating address of said packet is registered in said means for registering and managing, and decides whether said packet is to be transmitted to a mobile station or the carrier network based on said characteristics of the private network service and whether the terminating address of said packet is registered, and said means for connecting transmits said packet to the mobile station or the carrier network based on the decision result of said connection decision means.

2. A base station for use in a multi-network connection communication system comprising:

connection decision means for making a decision as to whether a mobile station is to be connected to a carrier network or a private network; and means for connecting said mobile station to said carrier network or said private network in accordance with the decision result, wherein said base station further comprises:

means for broadcasting characteristics of a private network service offered by said base station;

means for registering and managing addresses of mobile stations that use the base station as the private network; and means for receiving a packet from a mobile station or the carrier network, the packet having a terminating address, wherein said connection decision means decides whether the terminating address of said packet is registered in said means for registering and managing, and decides whether said packet is to be transmitted to a mobile station or the carrier network based on said characteristics of the private network service and whether the terminating address of said packet is registered, and said means for connecting transmits said packet to the mobile station or the carrier network based on the decision result of said connection decision means.

3. The base station as claimed in claim 1, wherein said base station further comprises service area decision means for making a decision of a service area based on said packet, and said connection decision means decides whether said packet is to be transmitted to a mobile station or the carrier network based on said characteristics of the private network service, whether the terminating address of said packet is registered, and the decision result of said service area decision means.

4. The base station as claimed in claim 1, wherein said base station further comprises means for receiving a registration request for using the base station as the private network from a mobile station, and said means for registering and managing registers and manages an address of the mobile station that transmits the registration request.

5. The base station as claimed in claim 1, wherein said connection decision means decides to transmit said packet to the carrier network, if the terminating address of said packet is not registered in said means for registering and managing.

6. The base station as claimed in claim 1, wherein said means for receiving receives a packet from a mobile station.

7. The base station as claimed in claim 1, wherein said means for receiving receives a packet from the carrier network.

8. A connecting method for use in a base station for use in a multi-network connection communication system comprising:

a connection decision step of making a decision as to whether a mobile station is to be connected to a carrier network or a private network; and a step of connecting said mobile station to said carrier network or said private network in accordance with the decision result, wherein said method further comprises:

a step of broadcasting characteristics of a private network service offered by said base station;

a step of registering addresses of mobile stations that use the base station as the private network in a means for registering and managing the addresses; and a step of receiving a packet from a mobile station or the carrier network, the packet having a terminating address, wherein said connection decision step decides whether the terminating address of said packet is registered in said means for registering and managing, and decides whether said packet is to be transmitted to a mobile station or the carrier network based on said characteristics of the private network service and whether the terminating address of said packet is registered, and said step of connecting transmits said packet to the mobile station or the carrier network based on the decision result of said connection decision step.

9. The method as claimed in claim 8, wherein said method further comprises a service area decision step of making a decision of a service area based on said packet, and said connection decision step decides whether said packet is to be transmitted to a mobile station or the carrier network based on said characteristics of the private network service, whether the terminating address of said packet is registered, and the decision result of said service area decision step.

10. The method as claimed in claim 8, wherein said method further comprises a step of receiving a registration request for using the base station as the private network from a mobile station, and said means for registering and managing registers and manages an address of the mobile station that transmits the registration request.

11. The method as claimed in claim 8, wherein said connection decision step decides to transmit said packet to the carrier network, if the terminating address of said packet is not registered in said means for registering and managing.

12. The method as claimed in claim 8, wherein said step of receiving receives a packet from a mobile station.

13. The method as claimed in claim 8, wherein said step of receiving receives a packet from the carrier network.

* * * * *

UNITED STATES PATENT AND TRADEMARK OFFICE

CERTIFICATE OF CORRECTION

PATENT NO. : 7,006,847 B2
APPLICATION NO. : 09/989018
DATED : February 28, 2006
INVENTOR(S) : Sato et al.

It is certified that error appears in the above-identified patent and that said Letters Patent is hereby corrected as shown below:

Title Page

Item 56, References Cited, FOREIGN PATENT DOCUMENTS, add the following references.

| | | |
|---|---|---|
| --EP | 0 758 188 | 12/1997 |
| AU | 199654588 | 5/1996 |
| GB | 2321158 | 7/1998-- |

Column 7

Line 30, change "Invention" to --invention--
Line 52, change "subsequently" to --Subsequently--

Column 8

Line 63, change "characteristics" to --pro or con--
Line 64, change "offered by said base station" to --by said system--
Line 66, change "base station" to --system--

Column 9

Lines 8 and 9, change "characteristics" to --pro or con--
Line 24, change "characteristics" to --pro or con--
Line 25, remove "offered"
Lines 36 and 37, change "characteristics" to --pro or con--
Line 49, change "characteristics" to --pro or con--

Column 10

Line 17, change "characteristics" to --pro or con--
Line 18, remove "offered"
Lines 30 and 31, change "characteristics" to --pro or con--

UNITED STATES PATENT AND TRADEMARK OFFICE

CERTIFICATE OF CORRECTION

PATENT NO. : 7,006,847 B2
APPLICATION NO. : 09/989018
DATED : February 28, 2006
INVENTOR(S) : Sato et al.

It is certified that error appears in the above-identified patent and that said Letters Patent is hereby corrected as shown below:

Column 10 (cont'd)
Line 43, change "characteristics" to --pro or con--

Signed and Sealed this

Twenty-fourth Day of April, 2007

JON W. DUDAS
*Director of the United States Patent and Trademark Office*